(12) United States Patent
Eastman

(10) Patent No.: US 8,345,289 B2
(45) Date of Patent: Jan. 1, 2013

(54) AUTOMATED DOCUMENT PROCESSING AUDIT SYSTEM WITH COST TRACKING AND ESTIMATION SYSTEM, APPARATUS AND METHOD

(75) Inventor: John Eastman, Santa Cruz, CA (US)

(73) Assignee: Ricoh Americas Corporation, West Caldwell, NJ (US)

( * ) Notice: Subject to any disclaimer, the term of this patent is extended or adjusted under 35 U.S.C. 154(b) by 593 days.

(21) Appl. No.: 12/486,369

(22) Filed: Jun. 17, 2009

(65) Prior Publication Data

US 2010/0321709 A1    Dec. 23, 2010

(51) Int. Cl.
*G06F 3/12* (2006.01)
*G06F 15/00* (2006.01)
*G06Q 10/00* (2012.01)

(52) U.S. Cl. ....... 358/1.15; 358/1.9; 705/7.22; 705/7.12

(58) Field of Classification Search .................. None
See application file for complete search history.

(56) References Cited

U.S. PATENT DOCUMENTS

| | | | | |
|---|---|---|---|---|
| 7,755,784 | B2* | 7/2010 | Parry et al. | 358/1.15 |
| 2004/0246520 | A1* | 12/2004 | Obert | 358/1.15 |
| 2005/0033834 | A1* | 2/2005 | Nutt | 709/223 |
| 2005/0175240 | A1* | 8/2005 | Parry et al. | 382/182 |
| 2006/0077431 | A1* | 4/2006 | Zhang et al. | 358/1.15 |
| 2006/0176509 | A1* | 8/2006 | Aoki et al. | 358/1.15 |
| 2006/0178917 | A1* | 8/2006 | Merriam et al. | 705/7 |
| 2007/0159647 | A1* | 7/2007 | Carling et al. | 358/1.12 |
| 2008/0309967 | A1* | 12/2008 | Ferlitsch et al. | 358/1.15 |

* cited by examiner

*Primary Examiner* — Twyler Haskins
*Assistant Examiner* — Barbara Reinier
(74) *Attorney, Agent, or Firm* — Cooper & Dunham LLP

(57) ABSTRACT

A system, apparatus and method are provided to automate an audit of an information technology (IT) system.

14 Claims, 17 Drawing Sheets

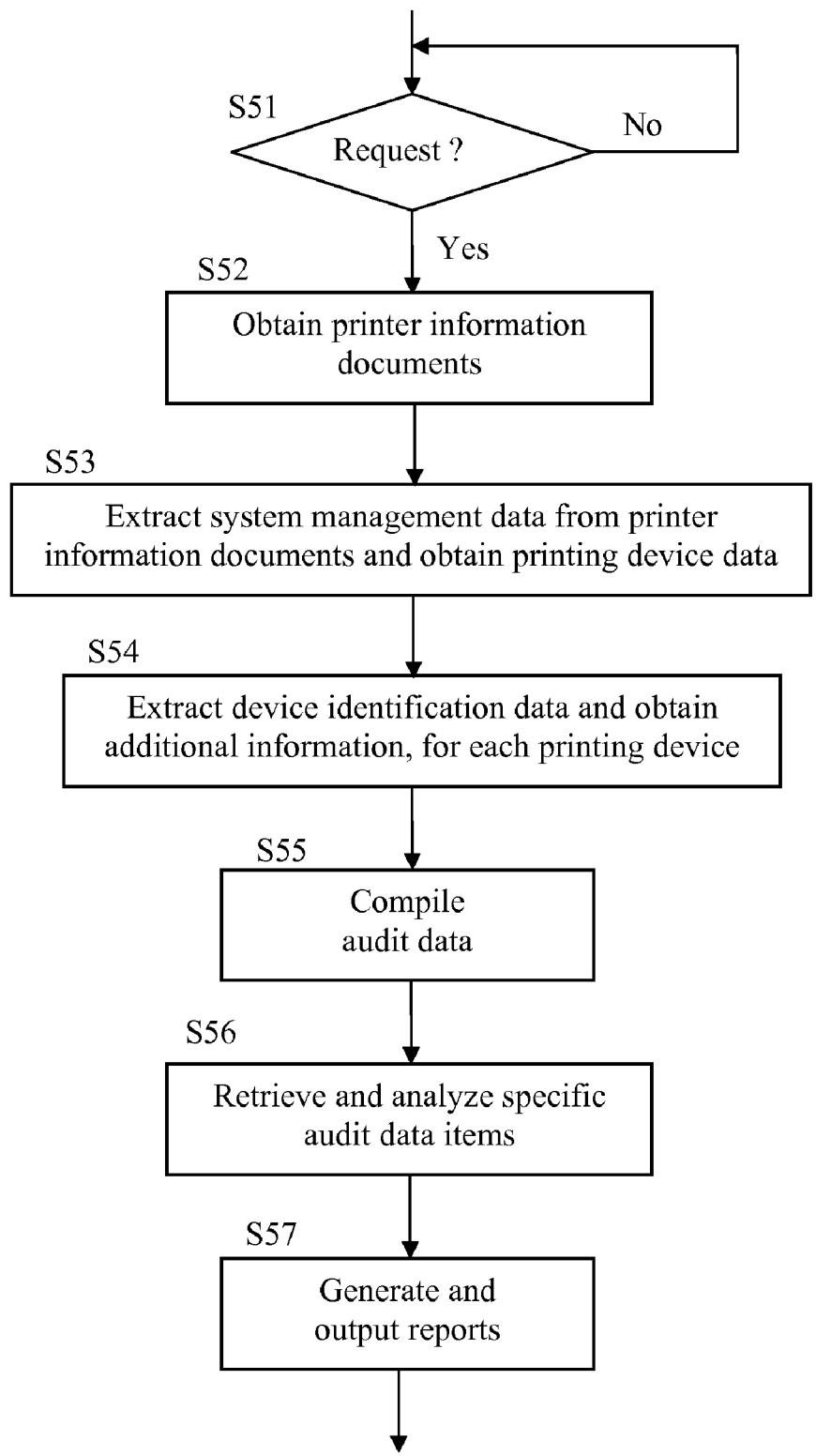

Fig. 6A

CONFIGURATION PAGE            PAGE 1

---

Printer Information
Product name: M1 IJ 1200
Product model number: C8154A
Product serial number: TH6AD5ZONG
Service ID: 17081
Firmware version: 20050908 MMR2021G
Auto-duplex unit: Installed
Printer memory: 32 MB
Pages printed: Tray 1 = 2419, Tray 2 = 11, Manual feed = 0, Auto-duplex = 4, Total = 2434

---

Ink Cartridge Status
Ink cartridge level (%)      Black = 73    Cyan = 95    Magenta = 18    Yellow = 40
Part number    M1 10(C4844A)    M1 11(C4836A)    M1 13(C4816A)    M1 13(C4817A)
Expiration date (Y-M-D)   2010-10-29    2010-08-27    2010-09-24    2010-09-30

---

Printhead Status
Printhead health      Black = Good    Cyan = Good    Magenta = Good    Yellow = Good
Part number    M1 11(C4810A)    M1 11(C4811A)    M1 11(C4812A)    M1 11(C4813A)
Warranted ink usage (ml)    530    200    200    200
Accumulated ink usage (ml)    99    13    12    8
Warranty status    Valid    Valid    Valid    Valid

---

Event Log

| ID | Time | Event | Page Count | Description |
|----|------|-------|------------|-------------|
| 1 | 2008-11-11 08:27:42 | 01BD-9EEC | 2404 | Firmware error |

Fig. 6B

-----SELF TEST-----

| PRINTING MENU | PCL MENU | JOB MENU |
|---|---|---|
| COPIES = 1 | FONT SOURCE = Internal | RESOLUTION = 600 |
| PAPER = LETTER | FONT NUMBER = 0 | PWRSAVE = 30 MIN |
| ORIENTATION = Portrait | PITCH = 10.00 | IO TIMEOUT = 15 |
| FORM = 60 LINES | SYM SET = ROMAN-8 | |
| MANUAL FEED = OFF | | |
| RET = MEDIUM | | |
| ECONOMODE = OFF | | |
| CONFIG MENU | MEM CONFIG MENU | PARALLEL MENU |
| MP TRAY = FIRST | IO BUFFER = AUTO | HIGH SPEED = YES |
| LOCK = NONE | | ADV FNTNS = ON |
| CLR WARN = ON | | |
| AUTO CONT = OFF | | |
| DENSITY = 3 | | |
| LOW TONER = CONT | | |
| SERIAL MENU | MIO MENU | TEST MENU |
| PACING = DTR/DSR | CFG NETWORK = NO | SELF TEST |
| BAUD RATE = 9600 | | CONT SELF TEST |
| DTR POLARITY = HI | | PCL TYPE LIST |
| | | PCL DEMO PAGE |

MIO
M3 LJ 4000A           IPX/SPX status: disabled    Snmp set cnty name: none    PCL Memory Information
Firmware Rev K.08.04                                                          Total Memory: 6 MBytes
HW Addr: 0030C1C39                                TCP/IP status: ready        Available Mem: 5.02 MB
Mfg ID: 40294029100808

I/O card ready                                    Host name: NPIC39329
                                                  Config by: user specified
NETWORK STATS                                     IP addr: 172.16.186.106
Unicast pkt rcvd: 1209798                         Sub mask: 255.255.254.0
Total pkt rcvd: 3361097                           Def gateway: 172.16.186.1
Bad pkt rcvd: 1354    Appletalk status: ready     Syslog server: not specif
Framing errors rcvd: 2  Etalk net: 65281          Idle timeout: 90 sec
Pkt transmitted: 243221  Node 005 P2
Unsendable pkt: 0     Appletalk name: LJ 4 Plus
Xmit collisions: 221  Etalk zone: *               DLC/LLC status: disabled
Xmit late collisions: 0

Formatter Number S460180PP1D                      RET = medium
Ram Size: 6MBytes
Page Count: 551815                                Firmware Datecode: 19931201
Control Panel Lock Status: disabled               Control Panel Password Status: disabled
Cartridge Installed: no                           Paper Trays: letter
Installed Options: none                           Installed Personalities: PCL (19931215)
I/O Buffering: 400 Kbytes                         Allocated: 4000 KBytes available

Fig. 6C

Self-Test Report
M2   OJ 7000
Serial #  MY6ABK80P104HQ
Service ID #  00000
Language  1
Country/Region  15
Device 93, 0
ADF Detected
Vertical Cartridge-to-Cartridge Alignment Setting:   -12
Horizontal Cartridge-to-Cartridge Alignment Setting:   0
Black Bidirectional Printing Alignment Setting:  6, 6, -6
Color Bidirectional Printing Alignment Setting:  0, 0, -18 : 0, 0, 0

Black Cartridge Test Patterns: (0)

<<PATTERNS>>

Color Cartridge Test Patterns: (0)

<<PATTERNS>>

Total Page Count:  9971

Fig. 6D

DIAGNOSTIC

M8 DJ 9000
Serial Number: SG4CG610SC
Service ID: 15088

FW Revision: ER00058R
Total Engine Page Count: 3278
Full Bleed Page Count (4 Ink/6 Ink): 0/0
PCL Default Symbol set: 341
Mfg 0-2: 000000000000
Pen ambient temperature: 250
Flash Checksum: 00000000
Error Code: C0100812, hw_device_not_responding
Cleanout/Duplexer Status: Cleanout Installed
PEN Status: 57: G   56: G
Trail Pick: 0   No Pick: 11   Extended Pick: 0

| Left Pen Led | Right Pen Led | Resume Led | Power Led | Printer Status | |
|---|---|---|---|---|---|
| CYCLE | CYCLE | CYCLE | CYCLE | POWER ON | |
| OFF | OFF | OFF | ON | IDLE | |
| OFF | OFF | OFF | BLINK | PRINTING | |
| OFF | OFF | OFF | 2 ON 1 OFF | CANCEL PRINTING | |
| OFF | OFF | BLINK | ON | IO STALL | *1 |
| OFF | OFF | BLINK | ON | DRY TIME WAIT | |
| OFF | OFF | BLINK | ON | OUT OF PAPER | |
| OFF | OFF | BLINK | ON | MEDIA SIZE MISMATCH | *2 |
| OFF | OFF | BLINK | ON | BANNER MISMATCH | *2 |
| OFF | OFF | BLINK | ON | BANNER EJECT NEEDED | *2 |
| OFF | OFF | BLINK | OFF | PAPER JAM | |
| OFF | OFF | BLINK | OFF | PAPER MOTOR STALL | |
| OFF | OFF | BLINK | BLINK | CARRIAGE MOTOR STALL | |
| OFF | OFF | CYCLE | CYCLE | SERVICE STATION STALL | |
| BLINK | BLINK | BLINK | BLINK | HARD ERROR | |
| OFF | OFF | ON | ON | CLEANOUT/DUPLEX MISSIN | |
| OFF | OFF | ON | ON | COVER OPEN | |
| ON | OFF | OFF | ON | LEFT PEN BAD/ABSENT | |
| OFF | ON | OFF | ON | RIGHT PEN BAD/ABSENT | |
| ON | ON | OFF | ON | BOTH PENS BAD/ABSENT | |
| BLINK | OFF | OFF | ON | LEFT PEN LOW INK | |
| OFF | BLINK | OFF | ON | RIGHT PEN LOW INK | |
| BLINK | BLINK | OFF | ON | BOTH PENS LOW INK | |

Fig. 6E

Diagnostic Page

Model: M8 DJ 1220C

Serial Number: SG35C1303MOK

Service ID: 13223

FW Version: EF410111

⟨ Total Engine Page Count: 341 ⟩

PCL Default Symbol Set: 341

Mfg 0-2: 000000000000

T val: 274

Pen ID: K 0x000338  CMY 0x01f135

Last Error Code: 90020403

Additional Fonts: No

LFC Sine Data: 0000000000

LFC Cosine Data: 0000000000

LFC OD Scale Data: 0000000000

Fig. 7A

| ID | Category | Manufacturer | Model | Serial Number | Networked | Net Address |
|---|---|---|---|---|---|---|
| 1 | B&W printer | M3 | LJ 1320 | CNHC59N4SO | Yes | 172.16.120.38 |
| 12 | B&W copier\MFP | M5 | ES 600 | cgj618063 | Yes | - |
| 20 | Scanner | M7 | SJ ADF | - | Yes | - |
| 25 | Fax | M4 | IF 4750e | BB6J537339 | No | - |
| 43 | Color copier\MFP | M6 | ES 650 | CMC413298 | Yes | - |
| 59 | Color printer | M1 | IJ 1200 | TH6AD5ZONG | No | - |
| 88 | B&W printer | M3 | LJ 4000A | - | Yes | 172.16.186.106 |
| 99 | Color MFP | M2 | OJ 7000 | MY6ABK80P104HQ | No | - |
| 101 | B&W printer | M8 | DJ 9000 | SG4CG610SC | No | - |
| 113 | Color printer | M8 | DJ 1220C | SG35C1303MOK | Yes | - |
| 118 | B&W printer | M3 | LJ 4200 | USDNX03422 | Yes | 172.17.4.247 |

Fig. 7B

| ID | Device B&W Speed | Device Color Speed | Read Date | B&W Read | Color Read |
|---|---|---|---|---|---|
| 1 | 22 | - | 03/19/09 | 44553 | - |
| | | | ... | | |
| 12 | - | - | 03/19/09 | 410621 | - |
| | | | ... | | |
| 20 | - | - | 03/19/09 | - | - |
| | | | ... | | |
| 25 | 15 | - | 03/19/09 | - | - |
| | | | ... | | |
| 43 | - | - | 03/19/09 | 30853 | 264167 |
| | | | ... | | |
| 59 | 28 | 24 | 03/19/09 | 2434 | 0 |
| | | | ... | | |
| 88 | 25 | - | 03/19/09 | 551815 | - |
| | | | ... | | |
| 99 | 30 | 20 | 03/19/09 | 9971 | 0 |
| | | | ... | | |
| 101 | 20 | - | 03/19/09 | 3278 | - |
| | | | ... | | |
| 113 | 11 | 9 | 03/19/09 | 0 | 341 |
| | | | ... | | |
| 118 | 35 | - | 03/19/09 | 118478 | - |

Fig. 7C

| ID | Acquis. Cost | Mo. Equip. Cost | Mo. Service Cost | per page B&W | B&W Mo.Vol. | per page Color | Color Mo.Vol. | Total Cost per Month |
|---|---|---|---|---|---|---|---|---|
| 1 | $327.18 | $5.45 | $2.73 | $0.0507 | 168 | - | - | $16.69 |
| 12 | $34,223.00 | $570.38 | $75.00 | - | 14,886 | - | - | $645.38 |
| 20 | $490.36 | $8.17 | - | - | - | - | - | - |
| 25 | $655.99 | $10.93 | $5.47 | $0.0453 | 21 | - | - | $17.35 |
| 43 | $40,500.00 | $675.00 | $170.80 | $0.0360 | 470 | $0.0900 | 4,026 | $1,225.06 |
| 59 | $2,291.90 | $38.20 | $19.10 | $0.0800 | - | $0.0900 | - | $570.30 |
| 88 | $1,147.18 | $19.20 | $9.56 | $0.0296 | 4,574 | - | - | $164.00 |
| 99 | $409.18 | $6.82 | $3.41 | $0.0300 | 363 | $0.0900 | 0 | $21.12 |
| 101 | $215.18 | $3.58 | $2.12 | $0.0800 | 119 | - | - | $15.22 |
| 113 | $245.18 | $4.09 | $2.04 | $0.0300 | 0 | $0.0900 | 3 | $6.40 |
| 118 | $819.18 | $13.65 | $6.83 | $0.0219 | 2,148 | - | - | $53.77 |

Fig. 7D

| ID | B&W Mo.Output | Max B&W Output | Color Mo. Output | Max Color Output | Utilization (%) |
|---|---|---|---|---|---|
| 1 | 168 | 9,134 | - | - | 1.83 |
| 12 | 14,886 | 16,608 | - | - | 89.63 |
| 20 | - | - | - | - | - |
| 25 | 21 | 6,228 | - | - | 0.34 |
| 43 | 470 | 12,456 | 4,026 | 8,304 | 48.48 |
| 59 | - | - | - | - | - |
| 88 | 4,574 | 9,965 | - | - | 45.90 |
| 99 | 362 | 9,134 | 0 | 8,304 | 3.97 |
| 101 | 119 | 12,456 | - | - | 0.96 |
| 113 | 1,337 | 12,456 | 3 | 8,304 | 10.73 |
| 118 | 2,148 | 14,532 | - | - | 14.78 |

Fig. 8A

Current Monthly Output Volume

| Technology Type | Volume |
|---|---:|
| B&W Copier\MFP | 16,525 |
| Color Copier\MFP | 0 |
| B&W Printer | 94,276 |
| Color Printer | 21,304 |
| Fax | <u>9,711</u> |
| Total: | 141,817 |

Fig. 8B

Current Monthly Output Volume

| Technology Type | Cost |
|---|---:|
| B&W Copier\MFP | $1,904.86 |
| Color Copier\MFP | - |
| B&W Printer | $4,683.21 |
| Color Printer | $4,364.50 |
| Fax | <u>$856.57</u> |
| Total: | $11,809.13 |

Fig. 8C

Age of Fleet

| Age | Number of Units |
|---|---|
| less than 1 Year | 1 |
| 1 to 2 Years | 17 |
| 2 to 3 Years | 38 |
| 3 to 4 Years | 1 |
| 4 to 5 Years | 17 |
| more than 5 Years | <u>44</u> |
| Total: | 118 |

Fig. 8D

Audit Results: Devices

| | |
|---|---|
| Total Current Device Count | 139 |
| Total Current User Count | 350 |
| Current User to Device ratio | 2.51 to 1 |
| Future Device Count | 25 |
| Future User to Device ratio | 14 to 1 |
| Industry average | 12-15 to 1 |

Fig. 8E

Audit Results: Costs

| | |
|---|---|
| Total Current Device Monthly Spend: | $11,812.62 |
| Total Future Monthly Spend: | $4,461.40 |
| Projected Monthly Savings: | $7,351.22 |
| | |
| Total Current Device Yearly Spend: | $141,751.44 |
| Total Future Yearly Spend: | $53,536.80 |
| Projected Yearly Savings: | $88,214.64 |

**\*\* *62.23% Savings* \*\***

| | |
|---|---|
| Current 3 Year Spend: | $425,254.32 |
| Projected 3 Year Savings: | $264,635.76 |

AUTOMATED DOCUMENT PROCESSING AUDIT SYSTEM WITH COST TRACKING AND ESTIMATION SYSTEM, APPARATUS AND METHOD

TECHNICAL FIELD

This disclosure relates to an audit of a multi-function (for example, functions for printing, scanning, facsimile transmission/reception, and the like) document handling system. In particular, the disclosure relates to system, apparatus and method for automating the audit.

BACKGROUND

In the current information age, there are often discussions that proliferation of information technology (IT) can lead to a paperless society and more convenience, efficiency, productivity, enjoyment, etc., in our lives. However, notwithstanding such discussions of a paperless society, there remains a great need by users of computers and other information terminals (that is, any of the various conventional devices which have a need to print on demand, such as personal computers, notebook computers, workstations, other types of computers, kiosks, PDAs, other information appliances, etc.) for printing, scanning, facsimile functionalities and the like. Indeed, the extensive use and development of IT facilities in an enterprise (or other organization) environment has been accompanied by escalating use of printers, scanners, facsimile devices and the like, in such environments.

Therefore, devices having printing or plotting functionality, such as printers, copiers, multi-function devices (having print, scan, copy, facsimile, and other functionality), etc., continue to play a significant role at home and at work. The terms "printer" and "printing device" are used hereinafter generically to include any output device having a printing or plotting functionality, and include multi-function devices (and multi-function printing system) having a copy and/or scanning functionality in addition to the printing or plotting functionality.

Many of the various IT functionalities that can facilitate work flow in an enterprise can be provided by multi function devices in a network multi function printing system. As part of the maintenance of such system, there is typically an ongoing or periodic assessment of cost versus usage and needs for consumables (such as paper, toner, ink, etc.) and system components. In the conventional approach to obtain a full understanding of workflow and print, scan, copy and facsimile (fax) usage, a solutions analyst walks through an enterprise, assessing information management conditions, pulling configuration pages from multi-function or printing devices, noting device volumes for fax and scan devices, and querying individual users and groups as to their scan and print usage.

When such a manual audit of all enterprise devices is concluded, the gathered information is manually entered into a master spreadsheet, to facilitate specific calculations for determining the overall document usage and associated costs. Such information includes, for example, serial number, total black output, total color input, firmware release date, etc.

However, this is a repetitive, time consuming and error prone process that wastes resources. In addition, the manual audit process requires a long time period to complete. The lag of the audit contributes to delay in adjustments in response to inefficiencies in the enterprise network printing system.

An improved approach is needed for gathering and processing audit information from an IT system to allow analysis and optimization of the system and workflow.

BRIEF SUMMARY

In accordance with this disclosure, tools (in the form of systems, apparatuses and methods) can be provided that automate an audit process and preferably output one or more reports, based on the automatically collected audit data, to enable assessment of a printing environment, such as in an enterprise or other organization or office. Such tools address the unsatisfied needs for a print audit process that is less time consuming and more cost efficient.

As should be appreciated from this disclosure in its entirety, the term "print audit" as used herein refers to audit of scanning and facsimile functionalities (and the like), as well as print functionalities. Likewise, the term "printing environment" as used herein refers to the scanning and facsimile functionalities (and the like), as well as the print functionalities.

In an aspect of this disclosure, manual entry of audit data is replaced by a document image reading process that includes performing character recognition [such as intelligent character recognition (ICR), optical character recognition (OCR), barcode recognition, and the like] on a printer information document image associated with a specific printer in the print environment, and intelligent processing to extract system management data from results of the character recognition. As discussed infra, printer information document image corresponds to any of various documents that a printer may generate, such as, for example, a configuration page, a diagnostic page, a self-test report, and the like. The system management data can correspond to various printer information of interest regarding the specific printer, such as, for example, count of total pages output by the printer, count of black-and-white (B&W) pages output by the printer, count of color pages output by the printer, manufacturer name, model identification, device type, serial number, device or service ID, network address, firmware version, the like.

In another aspect, device identifying data (for example, manufacturer name, model identification, device type, device or service ID, network address, etc.) for the specific printer is extracted from the system management data and utilized to obtain additional information of interest, from an external database through a network. The additional information may include, for example, device cost, supplies/consumables cost, product release date, consumable consumption rate, industry statistics, etc.

The system management data and additional information are used in combination to compile audit data that can be utilized to generate one or more reports.

BRIEF DESCRIPTION OF THE DRAWINGS

The above-mentioned and other aspects, features and advantages can be more readily understood from the following detailed description with reference to the accompanying drawings wherein:

FIG. 5 shows a flow chart for a method for performing an audit of a plurality of printing devices in a document processing environment;

FIGS. 6A-6E show examples of printer information documents;

FIGS. 7A-7D show an example of selected portions of a total document processing environment report; and FIGS. 8A-8E show an example of selected portions of a going-forward report.

DETAILED DESCRIPTION OF EXEMPLARY EMBODIMENTS

Figure 1A:
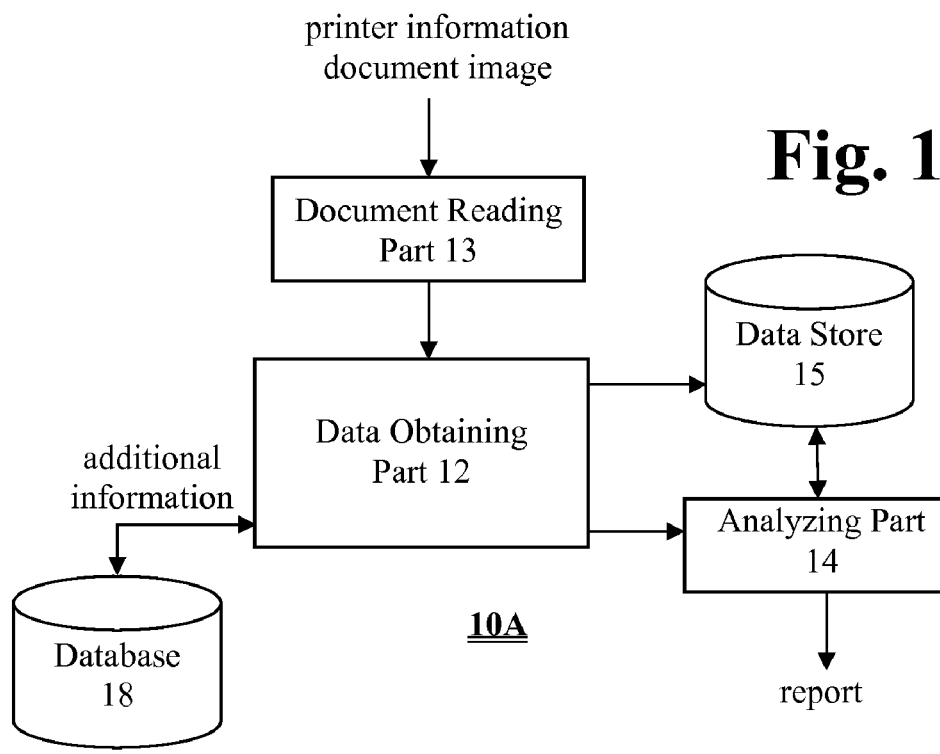
FIG. 1A shows a block diagram of an audit apparatus in accordance with an exemplary embodiment of this disclosure.

As will be appreciated from this disclosure, a document processing environment particularly in (but not limited to) an enterprise or organizational context in the current information age will have a large number of printing devices, and such devices can constitute a large portion of the IT (information technology) expenditures. This disclosure provides tools for automating an audit of an IT environment.

In describing preferred embodiments and examples illustrated in the drawings, specific terminology is employed herein for the sake of clarity. However, such description in this disclosure is not intended to be limited to the specific terminology so selected and it is to be understood that each specific element includes all technical equivalents that operate in a similar manner. In addition, detailed descriptions of known functions and configurations will be omitted when they may obscure the inventive aspects of this disclosure.

Referring now to the drawings, wherein like reference numerals designate identical or corresponding parts throughout the several views, FIG. 1A shows schematically an example of an apparatus configured to perform a print audit of printing devices, in response to a request for the print audit. Apparatus 10A illustrated in FIG. 1A includes a data obtaining part 12 and an audit data analyzing part 14, and in addition preferably a document reading part 13. It should be appreciated that FIG. 1A merely shows an example and that various variations are possible.

The document reading part 13 is preferably configured to perform character recognition processing on a printer information document image, typically containing information for a corresponding specific printing device in the printing system. The character recognition processing performed by the document reading part 13 may include any one or more optical character recognition (OCR), intelligent character recognition (ICR) or optical mark recognition (OMR) operations. Such functionalities are typically provided through software-controlled processing (such as, for example, by ABBYY FlexiCapture, Kofax Ascent Capture, other software having character recognition functionalities, etc.) on a device with adequate provisions for processing. It will be appreciated that the software-controlled device can have any of many different configurations, so long as the device has adequate processing capabilities. For example, the device can be, or include, any of the commonly-used types of computers (such as server, workstation, personal computer, notebook computer, etc.), hand-held terminal devices or other electronic devices including a processor or processing unit. As another example, the device may be one having scanning capabilities, such as a multi-function device (MFD) or multi-function peripheral device (MPF).

Character recognition processing capabilities are commonly provided in IT systems to allow extraction of text data or other character information from an electronic image, obtained through scanning or otherwise (for example, document image store), in order to enable further processing of the extracted information. This disclosure does not limit the extent of the character recognition processing technologies that can be used. On the other hand, such character recognition processing technologies are well-known in the art and therefore in the interest of brevity and clarity, a detailed discussion of such technologies is omitted.

Further, the document reading part 13 has, in addition to the character recognition capabilities, intelligent processing functionalities to extract system management data from a printer information document image, that is, from results of the character recognition processing. The aforementioned printer information document image represents any of the various documents, such as, for example, a configuration page, a diagnostic page, a self-test report, and the like, that a printer can output to report data stored therein. Some printer information of interest regarding the specific printer that may be extracted from the printer information document image include, for example, a count of total pages output by the printer, a count of black-and-white (B&W) pages output by the printer, a count of color pages output by the printer, manufacturer name, model identification, device type, serial number, device or service ID, network address, firmware version, the like.

The intelligent processing of the document reading part 13 can be the product of programming with embedded knowledge of the format of, and/or syntax used in, the printer information document (for example, as embodied in appropriately configured data objects corresponding to the printer information document, in object-oriented or other programming), and/or the product of machine-learning, such as through artificial neural net or other artificial intelligence techniques. Such techniques allow the document reading part 13 to be configured (for example, via supervised or unsupervised learning or training) to extract relevant information (or features) from the printer information document. Such approaches are further discussed infra.

The data obtaining part 12 is configured to extract device identifying data from the system management data of the specific printing device. The extracted device identifying data can be any of the various types of information that can be found in system management data, such as, for example, manufacturer name, model identification, device type, device or service ID, network address, etc.

The data obtaining part 12 utilizes the device identifying data to obtain additional information regarding, or corresponding to, the specific printing device from a database 18. For example, the database 18 may be one or more (external) printer information databases, such as the bliQ database from Buyers Laboratory Inc. (BLI), the OpenPrinting database, Mega Track, or the like, that can be accessed through a network, or internally maintained databases, such as a DNS (Domain Name System) database, WINS (Windows Internet Name Service) database, Active Directory, etc.

The system management data and the additional information are utilized by the data obtaining part 12 to compile audit data for an audit database (or data store) 15. The audit data stored in the audit database may be the product of merging, for each specific printer, the system management data and the additional information for that printer. The additional information merged in the audit data database may be actual data retrieved from the above-mentioned databases, or links to specific data in the databases, or a combination thereof.

The audit database (or data store) 15 may include a database application (such as Microsoft Access, dBase, Paradox, Lotus Approach, Oracle, or the like), and/or any ODBC (Open Database Connectivity)-compliant data container, and/or a CSV (comma-separated values) file or other structured data file, such as from Excel or another spreadsheet application.

The audit data analyzing part 14 retrieves and analyzes specific collections of items of the audit data (from the audit database 15). For example, the audit data analyzing part 14 retrieves, for each printer in the system, a count of black-and-white (B&W) pages output by the printer in a month (extracted by the document reading part 13 from printer information document image corresponding to the particular printer) and a B&W consumable per page (retrieved from the database 18), and calculates based thereon a monthly B&W print cost, and if applicable, a monthly color print cost can be determined as well.

The audit data analyzing part 14 generates, based on the retrieved data and calculations, and outputs a total-document-processing-environment report and/or a going-forward report proposing one or more changes to the document processing environment.

As mentioned above, the audit apparatus can be configured or embodied in or on any of various configurations or platforms, and the printer information document image can be obtained from any of various sources.

Figure 3:
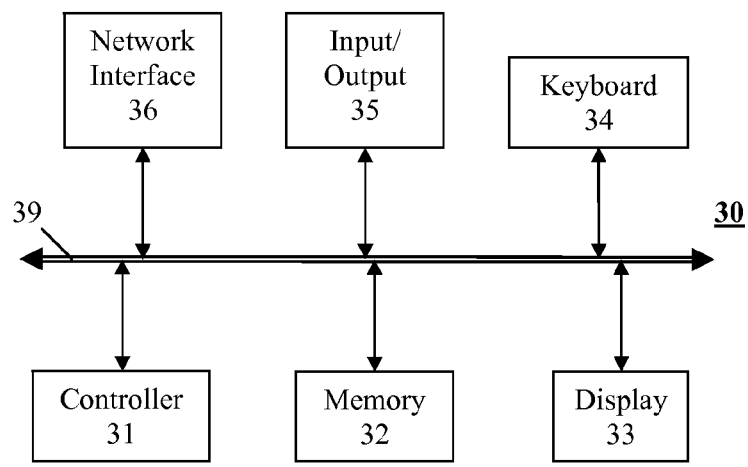
FIG. 3 shows a block diagram of an example of a computing device which can be configured to implement the audit apparatus shown in FIG. 1A and/or audit server in the system shown in FIG. 2C.

For example, FIG. 3 shows a block diagram for a typical computing device that can be configured through appropriate programming to implement the audit apparatus shown in FIG. 1A.

In FIG. 3, computing device 30 includes a controller (or central processing unit) 31 that communicates with a number of other components, including memory (and/or other storage devices) 32, display 33, keyboard (and/or keypad) 34, other input/output (such as mouse, touchpad, stylus, microphone and/or speaker with voice/speech interface and/or recognition software, etc.) 35 and network interface 36, by way of internal bus 39.

The memory 32 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 36 provides a connection (for example, by way of an Ethernet connection or other network connection which supports any desired network protocol such as, but not limited to TCP/IP, IPX, IPX/SPX, or Net-BEUI) to a network (such as any of an intranet, extranet, local area network, wide area network, or the like, or a combination thereof). How devices can connect to and communicate over the network is well-known in the art and therefore in the interest of brevity and clarity, a detailed discussion of such network connection and communication is omitted. Instead, the reader is referred to, for example, "How Networks Work", by Frank J. Derfler, Jr. and Les Freed (Que Corporation 2000) and "How Computers Work", by Ron White, (Que Corporation 1999), the entire contents of each of which are incorporated herein by reference.

The controller 31 executing program code instructions (stored in memory 32 or other conventional storage devices) controls operations of the computing device 30, including providing audit apparatus functionalities (such as those of the document reading part 13, data obtaining part 12, audit data analyzing part 14, etc.). In addition, the computing device 30 is configured to provide a conventional-type user interface including features that allow a user to request that a print audit be performed. On the other hand, such request can be received via the network interface 36 through the network from a remote terminal or device.

Likewise, one or more printer information document images can be stored in a local or attached storage device 28 (FIG. 2A) and retrieved from such storage device, for processing by the document reading part. On the other hand, the printer information document image can alternatively be retrieved from an external (for example, network-connected) document store through a network via a network interface (FIG. 2C). Similarly, the audit database (or data store) can be maintained in a local storage device (for example, FIG. 1A) or a network-attached storage device (for example, FIG. 2A).

Additional aspects or components of the computing device 30 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

As should be appreciated, the computing device 30 can be any electronic device having adequate processing resources, including but not limited to a personal, notebook, workstation or server computer, a kiosk, a PDA (personal digital assistant), a mobile or smart phone or handset, another information terminal, etc., that is preferably configured to communicate through a network with other devices.

The audit apparatus can be embodied in other configurations as well.

Figure 1B:
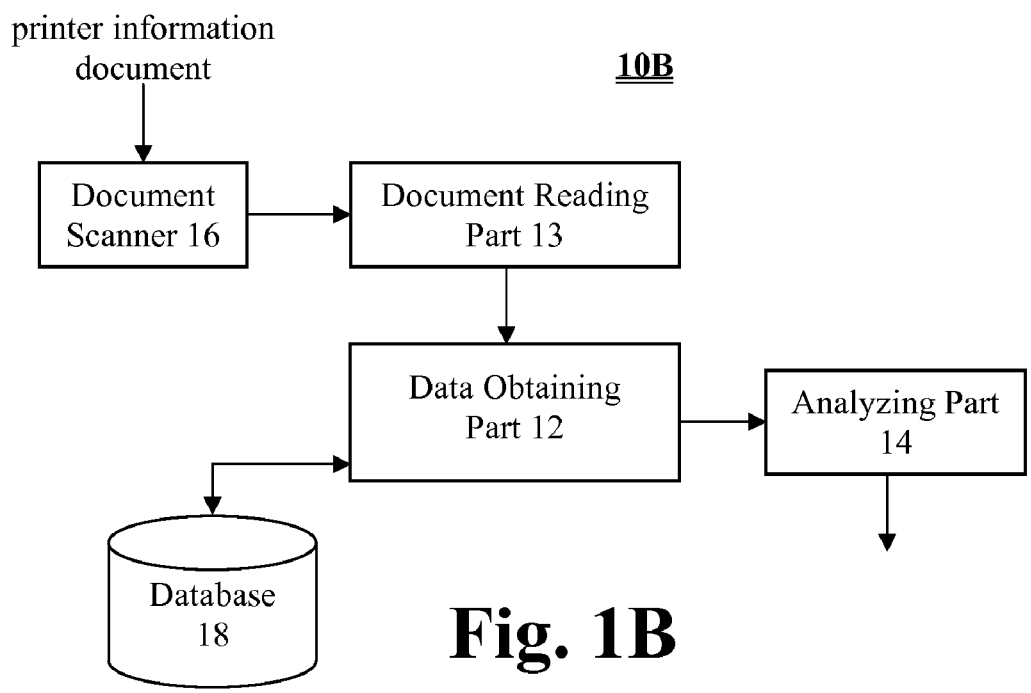
FIG. 1B shows a block diagram of an audit apparatus, in accordance with another exemplary embodiment.

FIG. 1B shows an example in which audit apparatus 10B includes a document scanner 16, in addition to the document reading part 13, data obtaining part 12 and audit data analyzing part 14. In the example of FIG. 1B, one or more printer information documents are fed to the document scanner 16 and the scanner scans the documents and outputs printer information document images in turn to the document reading part 13, directly or through a document store (not shown in FIG. 1A, but see FIG. 2C).

The document scanner 16 may be an attached scanner device (for example, to a workstation computer). Such scanner devices can be conventional and no special adaptations to conventional scanner devices need to be made to accommodate the print audit provisions of this disclosure. In the example of FIG. 1B, the document scanner 16 is shown connected to the document reading part 13. However, it should be understood that in other embodiments, the document scanner can be configured to be network-connected and such configurations of a document scanner can be conventional as well.

Further, the scanner capabilities may be embedded, and the audit apparatus 10B may be integrated, in a multi-function peripheral or multi-function device.

Figure 4:
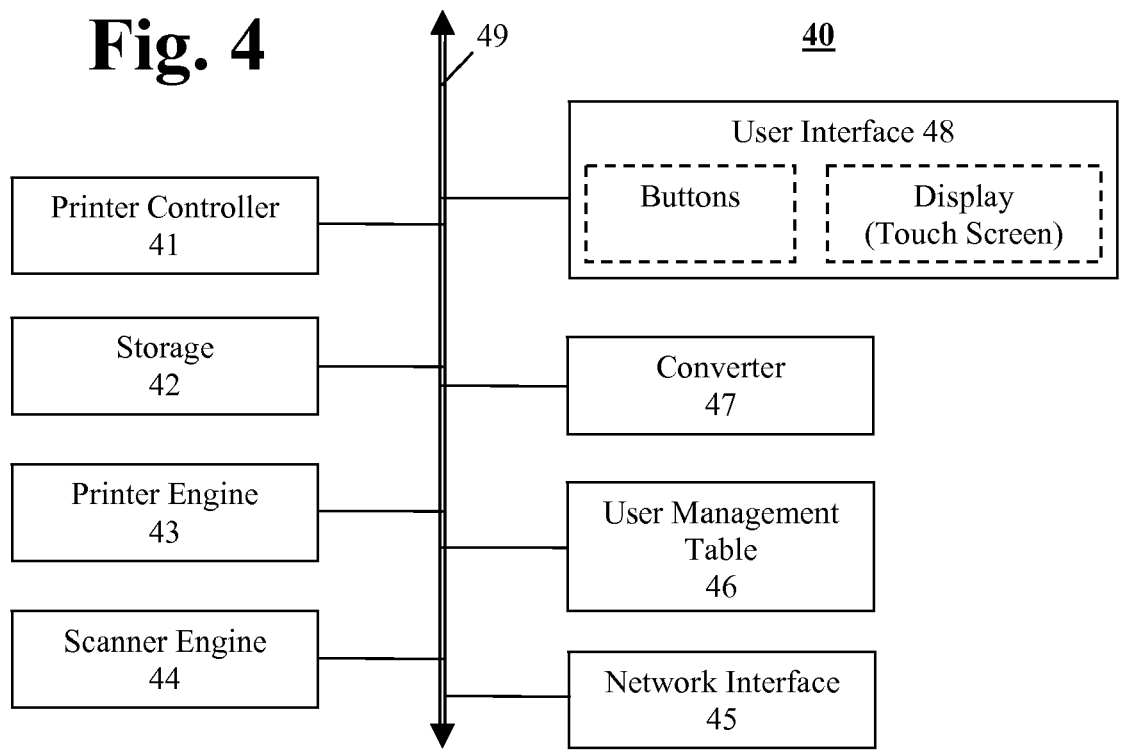
FIG. 4 shows a block diagram of an example of a multi-function device which can be configured to implement the audit apparatus shown in FIG. 1B.

FIG. 4 shows an example of a multi-function device or multi-functional peripheral device (collectively, "MFD")

which includes scanning and printing functions, and additionally can serve as a terminal for entering, saving and accessing electronic data or documents.

MFD apparatus 40 shown in FIG. 4 includes a controller 41, and various elements connected to the controller 41 by an internal bus 49, including storage 42 (for example, random access memory, read-only memory, hard disk drive, portable storage media drive such as for optical discs, magnetic discs, magneto-optical discs, etc., semiconductor memory cards, combinations of storage media, etc.), printer engine 43, scanner engine 44, network interface (I/F) 45, converter 47 for converting data from one format to another format (for example, a format suitable for printing, faxing, e-mailing, etc.), and user interface 48. The controller 41 controls and monitors operations of the MFD 40, and utilizes information stored in user management table 46 (or a LDAP, Lightweight Directory Access Protocol, database) to authenticate the user and control user access to the functionalities of the MFD.

Storage 42 can include one or more storage parts or devices, and program code instructions can be stored in one or more parts or devices of storage 42, and retrieved and executed by the controller 41 to carry out the instructions. Such instructions can include instructions for performing specified functions (such as printing, scanning, faxing, copying, e-mailing, etc.) of the MFD, enable the MFD to interact with a terminal and/or the management server, as well as perhaps other external devices, through the network interface 45, and to control the converter 47, access data in the user management table 46, and interactions with users through the user interface 48. In addition, storage 42 can store one or more programs of instructions for execution by the controller 41 to implement audit functionalities. The storage 42 may also encompass parts or devices for implementing a document store and/or an audit database (or data store). It should be appreciated that such document store or audit database (or data store) typically includes software interface and management components.

The user interface 48 includes one or more display screens that display, under control of controller 41, information allowing the user of the MFD 40 to interact with the MFD. The display screen can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFD, so as to allow the operator to interact conveniently with services provided on the MFD, or with the MFD serving as terminal for accessing electronic data or other content through the network. For example, a browser (such as Internet Explorer™, Netscape Navigator™, a proprietary browser, etc.) may be provided on the MFD so that the operator can use browsing operations to access a document or document image database. As another example, the operator can scan a document, and use the browser to upload the document image data document (and specify additional information associated with the image) to a database.

The display screen does not need to be integral with, or embedded in, a housing of the MFD, but may simply be coupled to the MFD by either a wire or a wireless connection. The user interface 48 may include keys and/or buttons (such as graphical keys or buttons, or other graphical elements, of a GUI on a touchscreen display) as well as a keyboard or keypad, mouse, remote control, voice recognition, or eye-movement tracking, or a combination thereof, for inputting information or requesting various operations. For example, the user interface may include a soft button, pull-down menu, tab, other conventional user interface features, etc., that enable a user to request that a print audit be performed.

Since the MFD 40 is typically shared by a number of users, and is typically stationed in a common area, the MFD preferably prompts the user to supply user credential or authentication information, such as user name (or other user or group information), password, access code, etc. The user credential or authentication information can be compared to data stored in the user management table 46 to confirm that the user is authorized to use the MFD. The user credential or authentication information may also be stored for the session and automatically supplied if access to other devices through the network requires it. On the other hand, such other devices may prompt the user to supply other user credential or authentication information through the user interface. In any event, it should be appreciated that the management table 46 can be expanded to include functions similar to the functions of management table 25 maintained by the management server 20, particularly when the MFD device is configured to serve as the management server in the system.

Other methods of authentication may also be used. For example, the multi-function device may be equipped with a card reader or one or more biometrics means (such as comparing fingerprints, palm prints, voice or speech, retinas or irises, facial expressions or features, signature, etc.).

Printer engine 43, scanner engine 44 and network interface 45 (similar to interface 36 in FIG. 3) are otherwise conventional, and therefore, a detailed description of such conventional aspects are omitted in the interest of clarity and brevity (so as not to mask the novel aspects of the subject matter of this disclosure).

The MFD 40 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

As should be appreciated after reading this disclosure the print audit apparatus is preferably embodied in a terminal or device that can be network-connected (and thus preferably has a network interface such as network interface 45 in FIG. 4, network interface 36 in FIG. 3, or the like).

Figure 2A:
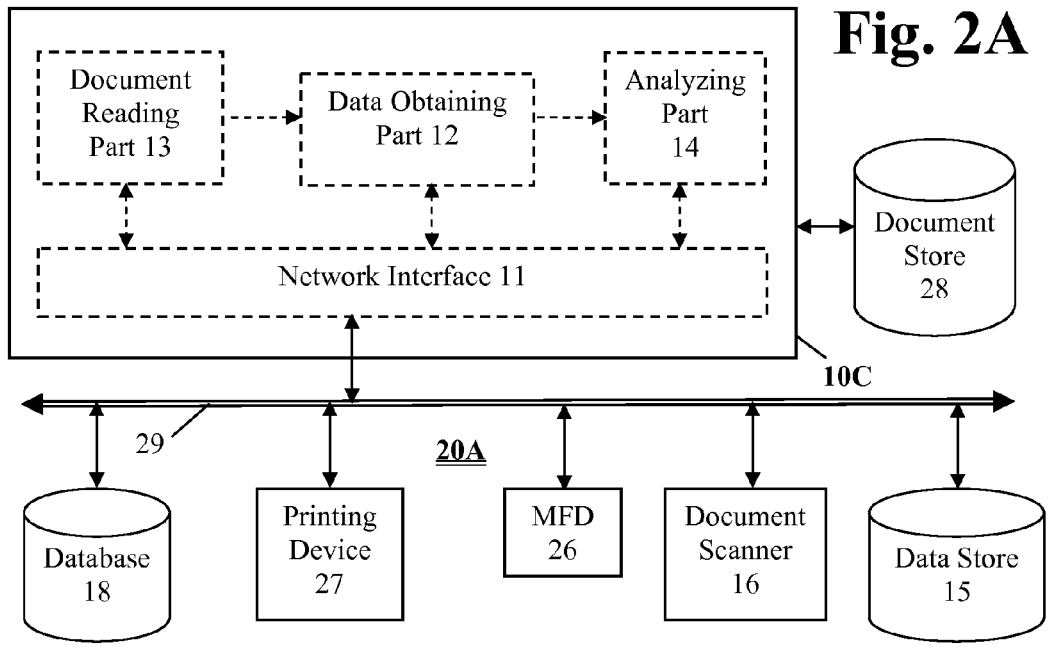
FIG. 2A shows a block diagram of an audit system in accordance with an exemplary embodiment of this disclosure.

An example of a print audit system in which the print audit apparatus is configured to communicate information over a network 29 is illustrated in FIG. 2A. In system 20A, the document reading part 13 of print audit apparatus 10C is configured to request and receive printer image document images from any of various image sources, such as document store 28 (shown in FIG. 2A as being connected directly to apparatus 10C, but may be connected to network 29 additionally or alternatively), or document scanner 16 or MFD 26 (or other sources) through network interface 11 (like network interface 36 in FIG. 3 and network interface 45 in FIG. 4) via network 29. Further, the document reading part 13 may receive printing device data via the network 29 from printing device 27, and extract system management data (at least in part) from the printing device data.

Figure 2B:
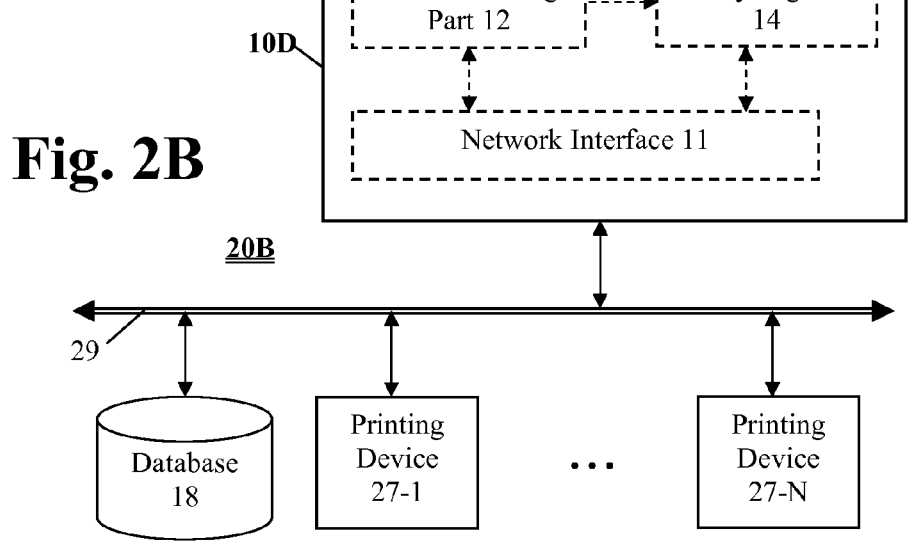
FIG. 2B shows a block diagram of an audit system in accordance with another exemplary embodiment.
Figure 2C:
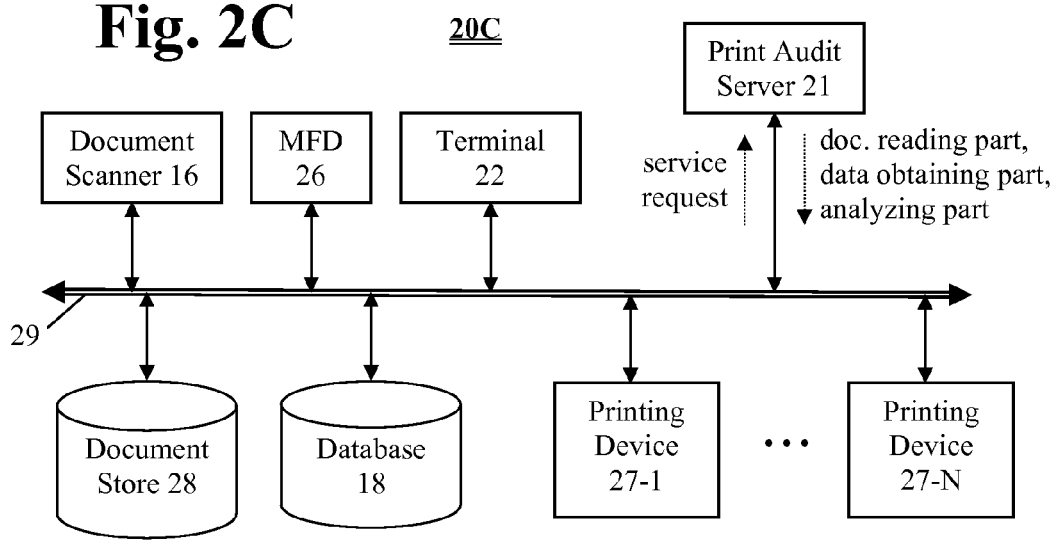
FIG. 2C shows a block diagram of an audit system in accordance with another exemplary embodiment.

In another embodiment (FIG. 2B), data obtaining part 12 of apparatus 10D in system 20B is configured to query printing devices 27-1 through 27-N and obtain printing device data from the devices. In addition, the data obtaining part 12 obtains additional information from the database 18, and compiles audit data based on the additional information and printing device data.

Many other embodiments are possible. For example, in system 20C shown in FIG. 2C, a print audit application, including any combination of the document reading part, data obtaining part and audit data analyzing part, is supplied by print audit server 21 as software-as-a-service (SaaS) on demand to a requesting device, such as terminal 22, MFD 26, any of printing devices 27-1 through 27-N, or the like, connected to network 29. SaaS is currently a popular software delivery approach wherein enterprises and users obtain access, over the Internet, to applications and related services that would otherwise have to be located on their own personal or enterprise computers.

Here, a requesting device receiving the print audit service can obtain the benefit of any of the print audit functions discussed herein, including (but not limited to) receiving printer information document images from assorted sources (such as document scanner 16, MFD 26, document store 28, etc.), processing the images to extract system management data, communicating with devices (such as 27-1 . . . 27-N) to obtain printing device data, extracting device identifying data from the system management data, and/or printing device data and obtaining additional information from one or more databases (such as 18), compiling audit data by utilizing the system management data and/or printing device data for a plurality of printing devices, analyzing the audit data and generating and outputting one or more reports regarding the document processing environment of the printing devices and/or proposing changes to the document processing environment, etc.

As should be appreciated by one skilled in the art, the print audit server 21 may be a conventional server, workstation or personal computer (for example, configured as shown in FIG. 3), with sufficient memory and processing capabilities and configured through software to operate as a server, or the server may be a special-purpose device (such as including one or more application specific integrated circuits or an appropriate network of conventional component circuits). Further, if adequate storage, processing and communication capabilities are included, the computing device can double as a database server (which in many respects can be configured similarly) to service requests from clients for data in the audit database or data store, and/or as a document store server.

A method for performing an audit of a plurality of printing devices in a document processing environment will be discussed, with reference to FIGS. 5-8, as well as the examples of print audit apparatuses (FIGS. 1A and 1B) and systems (FIGS. 2A-2C) referenced above.

The control process monitors for a request for a print audit (S51). Such request can be received in any of various manners. For example, in a case of a network-connected print audit apparatus, the request may be received from another network connected device through the network to which the audit apparatus is connected. On the other hand, the request may be received through a user interface of the print audit apparatus or the device in which the print audit apparatus is embedded. In another example (such as FIG. 2C), the request is received from a requesting device by a print audit server which supplies the print audit service on demand to the requesting device.

When the request is received (S51, Yes), the print audit apparatus proceeds to obtain printer information document images (S52). Such images, as mentioned supra, may be obtained in any one or more of a number of different manners. For example, the images may be obtained by scanning printer information documents (such as output by the printing devices) with a MFD or other device including a document scanner. In another example, such images are retrieved from a (local or network-connected) document store or database storing such images.

Examples of some different printer information documents are shown in FIGS. 6A-6E. FIG. 6A shows a configuration page generated by a printing device (corresponding to ID 59 in FIGS. 7A-7D). FIG. 6B shows a configuration page generated by another printing device (corresponding to ID 88 in FIGS. 7A-7D). FIG. 6C shows a configuration page generated by a third printing device (corresponding to ID 99 in FIGS. 7A-7D). FIG. 6D shows a configuration page generated by a fourth printing device (corresponding to ID 101 in FIGS. 7A-7D). FIG. 6E shows a configuration page generated by a fifth printing device (corresponding to ID 113 in FIGS. 7A-7D).

System management data is obtained or extracted by the document reading part of the print audit apparatus by performing character recognition processing and intelligently processing the results of the character recognition processing and by obtaining printer device data from the printing devices and/or from a store or database of such printer device data (S53).

The intelligent processing can be performed in any of various manners. It should be appreciated that, as mentioned above and as shown by way of examples in FIGS. 6A-6E, there can be many different types of printer information documents, and the printer information documents generated by different printing devices can have respective different format and different content (at least in part).

However, the printer information document generated by a specific printing device generally follows a predetermined format. Accordingly, one intelligent processing approach can include embedded knowledge (for example, in the form of a registered document template object, document format or parsing rules, another conventional representation of document format, etc.) of such format.

As one skilled in the art would understand from the examples of FIGS. 6A-6E, no single rule or data object can represent all of the nuisances of printer information document formats of all of the printing devices in the document processing environment. Indeed, the printer information document format of a specific printing device can change over time (for example, reflecting firmware version). Accordingly, the knowledge representation of a printer information document format is preferably individually maintainable and is preferably not hard-coded. On the other hand, groups of printing devices, in some instances, will output printer information documents of similar formats or the same format and thus in a case of such groups of devices, it may be more practical to represent knowledge of such format for the group in a collective (rather than individual) manner.

The data obtaining part of the print audit apparatus extracts, for each printing device being audited, device identifying data from the system management data, and utilizes the device identifying data to obtain additional information regarding the one or more printing devices from a database (S54). Such additional information obtained by the document reading part is discussed supra and is not repeated here.

Returning to the method of FIG. 5, the system management data and additional information for the printing devices being audited are processed by the data obtaining part of the print audit apparatus to compile audit data of a specific format (S55). The audit data may be stored in an external store or database, or may be stored internally of locally, for subsequent processing.

At an appropriate time (for example, after all of the system management data and additional information for the printing devices being audited are processed by the data obtaining part), specific items of the audit data are retrieved and an analysis of the retrieved items of the audit data is performed by the data analyzing part of the print audit apparatus (S56).

Further, the data analyzing part generates, based on such analysis, and outputs one or more of a total-document-processing-environment report for the document processing environment, a going-forward report proposing one or more changes to the document processing environment, or another (for example, customized) report that provides an enterprise or system administrator with the information needed to assess usage, cost and other factors, for deciding a course of action to be taken with regard to (perhaps modifying) the document processing environment (S57).

As mentioned above, some of the information extracted from the printer information documents will be used directly in the reports. For example, device usage data (such as a count of the pages printed by the printing device) can, in many instances, be extracted from the printer information document printed by the device, and can be reflected in the total-document-processing-environment report (see, for example, B&W Read column in FIG. 7B, in the cases of device ID 88 and device ID 101, both of which are black-and-white printing devices). It should be noted that the processing is not necessarily a single straightforward rule.

For example, different keywords associated with total page count may be present in the different printer information documents. Further, whereas the total page count in the case of a B&W (black-and-white) printing device is synonymously the total B&W page count, the total page count can be processed in several different ways in the case of color printing devices. One way is to determine whether there are separate totals for color printing and for B&W printing, respectively. Another way is to attribute a portion of the page count total to B&W printing and the remainder to color printing, based on other information (for example, a fixed ratio, usage of ink or toner, etc.). A third way is to attribute the entire total of the page count to only B&W printing (for example, in the cases of device ID 59 and device ID 99 in FIG. 7B) or to color printing only (for example, in the case of device ID 113 in FIG. 7B), in a case that there is not enough information, specific to pages of B&W printing or specific to pages of color printing, to attribute part of the total count to one and the remainder to the other, or in a case that the color printer, by policy, is used only for color printing or only for B&W printing.

On the other hand, some information extracted from the documents can be utilized by the data obtaining part to retrieve or obtain additional relevant information regarding the printing devices from other data sources, such as an external or other database. For example, the device Model information (see FIG. 7A) extracted from the printer information documents can be used to retrieve Device B&W Speed information (see FIG. 7B), per page B&W consumables cost information (see FIG. 7C), Max B&W Output information (see FIG. 7D), and Device Color Speed information (see FIG. 7B), per page Color consumables cost information (see FIG. 7C) and Max Color Output information (see FIG. 7D), when applicable, from a BLI (Buyers Laboratory Inc.) database or another database. Likewise, device identifying information, such as Serial Number information, device name information, etc., can be utilized to obtain information from a DNS database, WIN database, Active Directory, IT asset database (indicating equipment acquisition cost, service cost, installation date, and the like), etc.

Further, other information of interest for managing the document processing environment may not be explicitly shown in the printer information documents, but nevertheless can be determined or calculated based on the information extracted from the documents and/or the additional relevant information obtained from other data sources. For example, Monthly Equipment Cost (see FIG. 7C) can be determined based on, for example, Acquisition Cost (see FIG. 7C) divided by Useful Life (typically, a predetermined or specified number of months; not shown in drawings). Estimated monthly consumables cost can be determined based on, for example, per page B&W consumables cost information (see FIG. 7C) multiplied by estimated B&W Monthly Volume (see FIG. 7C), plus per page Color consumables cost information (see FIG. 7C) multiplied by estimated Color Monthly Volume (see FIG. 7C). Total Cost per Month (see FIG. 7C) of a printing device can be determined based on, for example, a sum of Monthly Equipment Cost, Monthly Service Cost (see FIG. 7C) and estimated monthly consumables cost. Utilization percentage (see FIG. 7D) can be determined based on, for example, the higher of the ratio of B&W Monthly Output to Max B&W Output and the ratio of Color Monthly Output to Max Color Output.

Many other information, not shown in FIGS. 7A-7D, can be included in the Total Document Processing Environment report.

An example of selected portions of a going-forward report is illustrated in FIGS. 8A-8E. Whereas the total-document-processing-environment report presents a per-device view of the audit data for the document processing environment, a going-forward report presents a big picture view of the document processing environment and proposes one or more changes to the environment The above specific embodiments and examples are illustrative, and many variations can be introduced on these embodiments and examples without departing from the spirit of the disclosure or from the scope of the appended claims.

In the examples above, the audit data collected from printers include assorted types of pages output. It should be understood that the subject matter of this disclosure can also include tools that collect audit data associated with devices that have facsimile transmission and/or reception functionalities (for example, pages received, pages transmitted, and the like), and audit data associated with devices that have document scanning functionalities (for example, pages scanned and the like).

It should be apparent that elements and/or features of different examples and illustrative embodiments may be combined with each other and/or substituted for each other within the scope of this disclosure and appended claims.

What is claimed is:

1. An apparatus for performing a print of a plurality of printing devices in a document processing environment, in response to a request for the print audit, said apparatus comprising:

a document reading part configured to perform character recognition processing on a printer information document image for one or more of the printing devices in the printing system, and extract system management data corresponding to the one or more printing devices, from results of the character recognition;

a data obtaining part configured to extract device identifying data from the system management data of the one or more printing devices, utilize the device identifying data to obtain additional information regarding the one or more printing devices, and compile audit data based on the system management data and the additional information, the additional information including device-specific information corresponding to the one or more printing devices that is additional to the extracted system management data; and an audit data analyzing part configured to analyze specific items of the audit data, and generate and output a total-document-processing-environment report for the document processing environment, wherein for each specific printing device of the one or more printing devices, the device-specific information includes one or more of a device cost associated with the specific printing device, a supplies or consumables cost associated with the specific printing device, a product release date associated with the specific printing device, capacity and performance data of the specific printing device, and industry statistics associated with the specific printing device, and wherein the total-document-processing-environment report includes, for said each specific printing device of the one or more printing devices, per-device cost information generated, by the audit data analyzing part, based on the extracted system management data and the device-specific information that is additional to the extracted system management data, for the specific printing device.

2. The apparatus as claimed in claim 1, wherein the document reading part receives the printer information document image from a document image source, performs character recognition processing on the printer information document image to obtain the system management data, and supplies the system management data to the data obtaining part.

3. The apparatus as claimed in claim 1, wherein at least some of the audit data compiled by the data obtaining part is based on device data obtained from the one or more specific printing devices through the network.

4. The apparatus as claimed in claim 1, wherein the audit data compiled by said data obtaining part includes device usage data.

5. The apparatus as claimed in claim 1, wherein the system management data obtained by the document reading part includes one or more of a count of total number of pages output by the specific printing device, model or device identification of the specific printing device, a device type of the specific printing device, a serial number of the specific printing device, a service ID of the specific printing device, a network address of the specific printing device, and a Firmware version of the specific printing device.

6. The apparatus as claimed in claim 1, wherein the total-document-processing-environment report provides a total document environment cost for the document processing environment including the plurality of printing devices, and the total document environment cost includes acquisition or lease cost, consumables cost and service cost.

7. The apparatus as claimed in claim 1, wherein the total-document-processing-environment report indicates an output volume of the plurality of printing devices collectively for a specific period of time.

8. The apparatus as claimed in claim 1, wherein the total-document-processing-environment report indicates at least one of (a) estimated cost for the plurality of printing devices collectively for a specific period of time, (b) for each of the plurality of printing devices, an output volume of the printing device for a specific period of time, and/or (c) for each of the plurality of printing devices, estimated expenditures for the printing device.

9. An automated audit system for a plurality of peripheral devices in a document processing environment, said system comprising:

a document scanner configured to scan a printer information document, and generate a printer information document image; and an audit service providing part configured to provide an audit service through a network, in response to a request for the audit service, said audit service including:

a document reading part configured to perform character recognition processing on one or more printer information document images corresponding to one or more specific printing devices, and extract system management data associated with the one or more specific printing devices, from results of the character recognition;

a data obtaining part configured to extract device identifying data from the system management data of the one or more specific printing devices, utilize the device identifying data to obtain additional information regarding the one or more specific printing devices, and compile audit data based on the additional information and the system management data, the additional information including device-specific information corresponding to the one or more printing devices additional to the extracted system management data; and an audit data analyzing part configured to analyze specific items of the audit data, and generate and output a report of the total document processing environment, wherein for each specific printing device of the one or more printing devices, the device-specific information includes one or more of a device cost associated with the specific printing device, a supplies or consumables cost associated with the specific printing device, a product release date associated with the specific printing device, capacity and performance data of the specific printing device, and industry statistics associated with the specific printing device, and wherein the total-document-processing-environment report includes, for said each specific printing device of the one or more printing devices, per-device cost information generated, by the audit data analyzing part, based on the extracted system management data and the device-specific information that is additional to the extracted system management data, for the specific printing device.

10. The system as claimed in claim 9, wherein the data obtaining part stores the audit data into a data store in a predetermined format, and the audit data analyzing part retrieves the specific items of the stored data from the data store.

11. The system as claimed in claim 9, further comprising:

a document store configured to store a plurality of printer information document images received from one or more scanner devices, wherein said document reading part retrieves at one printer information document image from the document store, and performs the character recognition processing on the at least one printer information document image to extract system management data for at least one printer.

12. A method for performing an audit of a plurality of printing devices in a document processing environment, said method comprising the steps of:

(a) receiving a request for a print audit from a terminal through a network;

(b) obtaining system management data of one or more of the printing devices, extracting device identifying data from the system management data and utilizing the device identifying data to obtain additional information regarding the one or more printing devices, in response to the request received through the network in (a), the additional information including device-specific information corresponding to the one or more printing devices additional to the obtained system management data;

(c) compiling audit data based on the system management data and additional information obtained in (b);

(d) storing the audit data in a predetermined format into a data store; and (e) retrieving specific items of the stored audit data from the data store, and performing an analysis of the retrieved items of the audit data; and (f) generating and outputting, based on the analysis in (e), a total-document-processing-environment report for the document processing environment, wherein for each specific printing device of the one or more printing devices, the device-specific information obtained from the database includes one or more of a device cost associated with the specific printing device, a supplies or consumables cost associated with the specific printing device, a product release date associated with the specific printing device, capacity and performance data of the specific printing device, and industry statistics associated with the specific printing device, and wherein the total-document-processing-environment report includes, for said each specific printing device of the one or more printing devices, per-device cost information generated, by the audit data analyzing part, based on the extracted system management data and the device-specific information that is additional to the extracted system management data, for the specific printing device.

13. The method as claimed in claim 12, further comprising performing character recognition processing on a printer information document image to obtain the system management data.

14. The method as claimed in claim 12, further comprising:

scanning a printer information document and generating a printer information document image for the printer information document; and performing character recognition on the printer information document image to obtain the system management data.

* * * * *